United States Patent [19]

Szczepanek

[11] Patent Number: 5,374,926
[45] Date of Patent: Dec. 20, 1994

[54] COMMUNICATIONS CIRCUIT HAVING AN INTERFACE FOR EXTERNAL ADDRESS DECODING

[75] Inventor: Andre Szczepanek, Brickhill, England

[73] Assignee: Texas Instruments Incorporated, Dallas, Tex.

[21] Appl. No.: 145,040

[22] Filed: Oct. 27, 1993

Related U.S. Application Data

[63] Continuation of Ser. No. 759,981, Sep. 16, 1991, abandoned, which is a continuation of Ser. No. 405,361, Sep. 11, 1989, abandoned, Continuation of Ser. No. 64,289, Jun. 18, 1987, Pat. No. 4,866,421.

[51] Int. Cl.$^5$ .............................................. H04Q 1/00
[52] U.S. Cl. ........................... 340/825.52; 340/825.05; 340/825.5
[58] Field of Search ............ 340/825.52, 825.05, 340/825.5; 370/85.5, 85.9, 85.12, 85.13, 85.14, 85.15, 94.1

[56] References Cited

U.S. PATENT DOCUMENTS

| | | | |
|---|---|---|---|
| 3,731,002 | 5/1973 | Pierce | 370/85.14 |
| 4,287,592 | 9/1981 | Paulish et al. | 370/85.14 |
| 4,571,675 | 2/1986 | Stambaugh et al. | 364/200 |
| 4,597,078 | 6/1986 | Kempf | 370/85.13 |
| 4,621,362 | 11/1986 | Sy | 370/85.14 |
| 4,627,052 | 12/1986 | Hoare et al. | 370/85.14 |
| 4,638,477 | 1/1987 | Okada et al. | 370/85.5 |
| 4,674,086 | 6/1987 | Szczepanek et al. | 370/85.5 |
| 4,680,756 | 7/1987 | Sugimoto et al. | 370/85.14 |
| 4,706,081 | 11/1987 | Hart et al. | 370/85.13 |
| 4,715,030 | 12/1987 | Koch et al. | 340/825.5 |
| 4,737,953 | 4/1988 | Koch et al. | 370/85.13 |

Primary Examiner—Michael Horabik
Assistant Examiner—Edwin C. Holloway, III
Attorney, Agent, or Firm—Robert D. Marshall, Jr.; James C. Kesterson; Richard L. Donaldson

[57] ABSTRACT

An adapter circuit for a local area network is disclosed, which contains logic external to the protocol handler for address comparison. The adapter uses random-access memory to store the data fields arriving after the address fields in the serial input data stream during such time as the adapter is comparing the address fields to its own address. The portion of memory used for the data storage is overwritten (recovered) by the next frame of data if the particular adapter was not addressed by the prior frame; the portion of memory used for the data storage is not overwritten if the data was addressed to the adapter. The protocol handler circuit performs an address comprising internally thereto, for intra-ring communication, and controls the recovery of the memory dependent upon the results of the comparison. The external logic performs an address comparison, primarily in inter-ring communication. An interface is provided within the protocol handler circuit to disable the recovery of the memory in the event of a true comparison found by the external logic, regardless of the results of the comparison performed by the protocol handler circuit itself. Two bi-directional signal lines are used for communication between the protocol handler circuit and the external logic. The protocol handler circuit sets a logic state on both lines to indicate the beginning of a frame, and one line or the other is set by the external logic to communicate its results.

15 Claims, 8 Drawing Sheets

COMMUNICATIONS CIRCUIT HAVING AN INTERFACE FOR EXTERNAL ADDRESS DECODING

This is a continuation of application Ser. No. 07/759,981 filed Sep. 16, 1991, entitled "Communications Circuit Having An Interface for External Address Decoding" by Andre Szczepanek, now abandoned, which is a continuation application of application Ser. No. 07/405,361 filed Sep. 11, 1989, entitled "Communication Circuit Having An Interface For External Address Decoding" by Andre Szczepanek, now abandoned, which is a continuation application of application Ser. No. 07/064,289, filed Jun. 18, 1987 and entitled "Communications Circuit Having An Interface for External Address Decoding", now U.S. Pat. No. 4,866,421, issued Jun. 18, 1989.

BACKGROUND OF THE INVENTION

The present invention relates to an apparatus used in communications among data processing devices, for example personal computers. More specifically, the present invention is directed to a device useful for increasing the range of address recognition capabilities in a local area network (lan) controller.

In communication systems which operate by way of having one or more destination stations respond to addressed packets or frames of information, the operating speed of the system would be significantly reduced if data transmission would have to wait while each station decodes the address to determine if it is to receive or ignore the data. Accordingly, the destination stations in such a system preferably store the beginning of the information temporarily, during the analysis of the accompanying address information. This temporary storage, or "buffering" of the data, is especially useful in the implementation of a local area network based upon the Token Ring Access Method and Physical Layer Specification, ANSI/IEEE Std. 802.-1985, ISO Draft Proposal 8802/5, approved Dec. 13, 1985, such a local area network hereinafter referred to as a "token ring LAN". The token ring LAN has a number of stations, such as personal computers, interconnected via LAN adapter circuitry into a serial ring, so that data is transmitted from one station to another on the ring through all of the intervening stations. A description of the construction and operation of such adapter circuitry is given in U.S. Pat. No. 4,571,675, issued Feb. 18, 1986, and assigned to Texas Instruments Incorporated. An address field is provided within the data "frame", so that the LAN adapters of such intervening stations will ignore data which is intended for another station on the ring. However, in order to maximize the communications rate, each LAN adapter on the token ring LAN decodes the address field in parallel with the storage of data following the address field. In the event that a rather small address field (capable of addressing a limited number of stations on a ring) is to be used, a FIFO or "first-in-first-out" buffer can be used to storage the first data in the frame after the address field.

A larger address field, comprising multiple data words, may require that the words at the start of a frame may be stored in a larger memory within the LAN adapter, such as random access memory. If, as a result of comprising the address field of the frame, a LAN adapter determines that the frame is not one which it should copy (i.e., retain in memory), the memory space used to storage the frame data may be recovered merely by writing data from the next frame into those locations in memory which stored the prior frame data. An integrated circuit, such as the TMS 38020 protocol handler integrated circuit manufactured and sold by Texas Instruments Incorporated, is generally provided for each LAN adapter on the token ring LAN to not only perform the address field comparison function described above, but also to control the necessary operations to allow utilization of the frame data or to recover the memory space used in the storage of the frame data, depending upon the result of the address field comparison function. U.S. Pat. No. 4,674,086 issued Jun. 16, 1987, and assigned to Texas Instruments Incorporated contains a description of the construction and operation of a protocol handler integrated circuit such as the above-referenced TMS 38020.

However, a token ring LAN may be desired which provides for an addressing scheme beyond that utilized in a single token ring LAN system in which the addressing field specifies a certain station on the ring. For example, since the number of stations on a single ring may be limited to a finite number (e.g., 256 stations), stations may be set up which are resident on more than one ring (such stations generally termed "bridges"), thereby providing a path for communication from a station on a first ring to a station on a second ring. An example of an addressing scheme in such an arrangement is the source routing bridging scheme, where the station which is the source of the data will send out a series of address fields specifying the ring and address of the destination station, as well as the rings and bridges between the source and destination through which the data is to be routed. In such an arrangement, depending upon the particular configuration of the rings and stations, the address fields and accompanying comparison schemes will necessarily be more complex than those which are incorporated into the protocol handler (or functionally equivalent) circuit. Since the specific configuration of the rings and bridges within the LAN may be customized for a particular application, the costs of designing and producing a new protocol handler circuit incorporating the new address field comparison logic are often prohibitive; this is especially true where not all of the stations will serve as bridges, and thus will not need the additional comparison logic. Accordingly, logic hardware external to the protocol handler circuit is useful in providing such customized comparison functions for LAN adapters associated with such bridge stations, leaving the original comparison functions in place and operable for non-bridge stations, and for bridge stations where the bridge station is itself the final destination of the data frame.

The external logic utilized for the extended address field comparison is likely to be neither synchronous nor consistent with the address field comparison which is performed internal to the protocol handler circuit. Accordingly, it is necessary to provide an interface between the protocol handler circuit and such external logic.

It is therefore an object of this invention to provide a protocol handler having an interface to external address field comparison logic in a token ring LAN adapter.

It is a further object of this invention to provide such an interface which, during the external comparison function, allows the storage of the data frame in random access memory in a recoverable fashion.

It is a further object of this invention to provide such a protocol handler which is independent of the type of address field under comparison.

Other objects will be apparent to those of ordinary skill in the art having reference to this description and the accompanying drawings.

SUMMARY OF THE INVENTION

According to the invention there is provided an interface within a protocol handler circuit of a LAN adapter, which provides for communication between the protocol handler and specific address field comparison logic external to the protocol handler circuit. The external address field comparison logic is useful to decode extended address fields within a frame of data communicated over the LAN, for purposes such as the implementation of inter-ring communication using source routing addressing. Communication between the protocol handler and the external address field comparison logic occurs over a pair of bidirectional signal lines. The two lines are used by the protocol handler to indicate the presence of the start of a frame to the external logic circuitry, so that the external logic circuitry may analyze the proper address words in the data frame. After its comparison is complete, the external address field comparison logic will communicate the results over the same two lines to the protocol handler. Sequential logic is provided within the protocol handler circuit to enable the frame of data to be retained by the LAN adapted if the external comparison determines that the frame is intended for the LAN adapter, regardless of the address comparison made internally by the protocol handler.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENT

Figure 1:
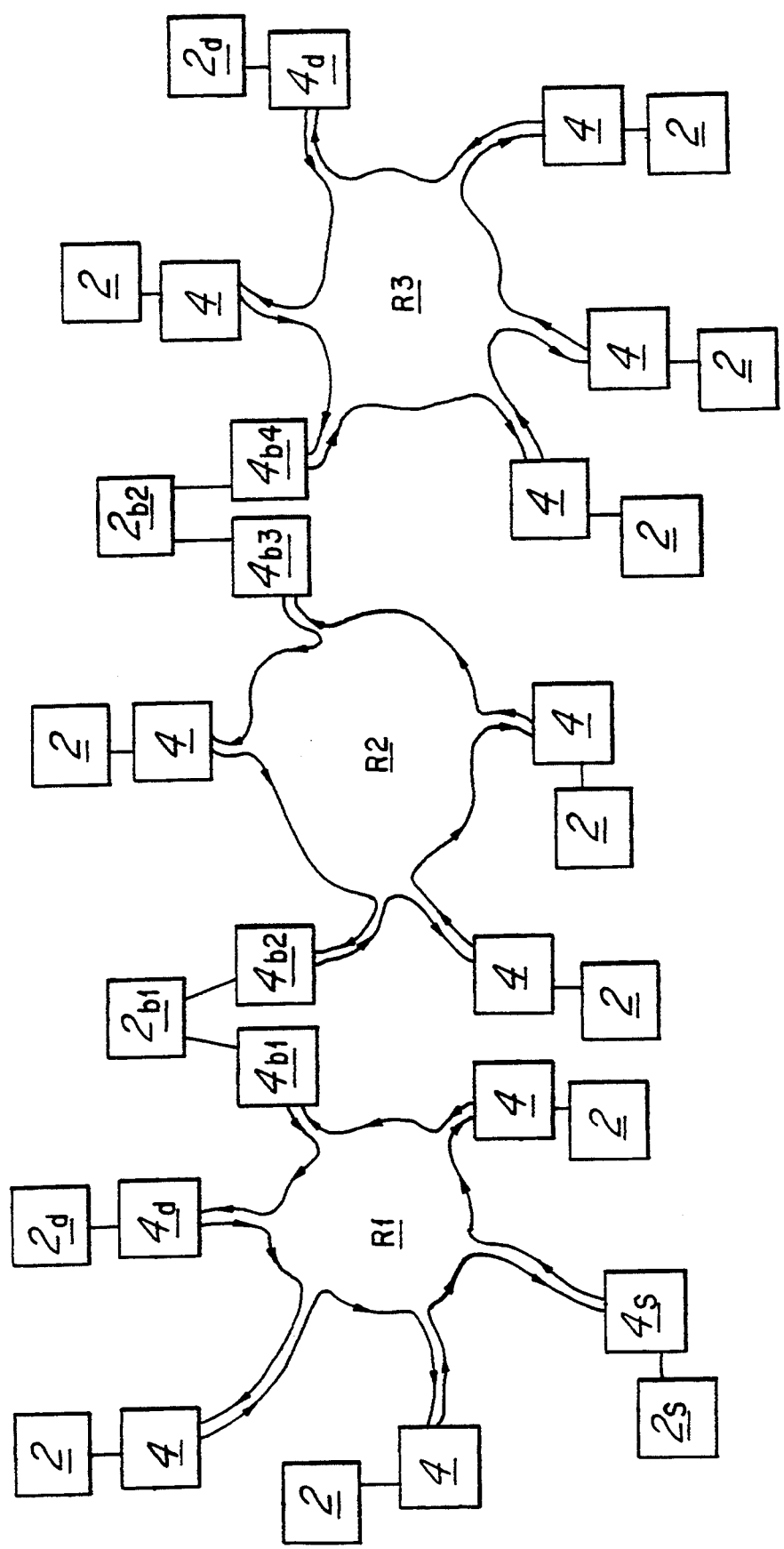
FIG. 1 is a block diagram of a local area network incorporating multiple LAN rings.

Referring now to FIG. 1, a token ring LAN is shown which allows communication among a plurality of stations 2 organized in a multiple and ring arrangement. Each of stations 2 is preferably a personal computer or similar device capable of storing information and also performing data processing operations upon such stored data. Each station 2 is connected to a LAN adapter 4 which, as will be described in greater detail hereinbelow, provides the interface between its corresponding station 2 and the other stations 2 on the token ring LAN.

The token ring LAN of FIG. 1 has three communication paths, namely rings R1, R2 and R3. Each of the rings R1, R2 and R3 constitute the serial interconnection along the LAN adapters 4 located thereupon, as is well known in the art for a token ring LAN system. Rings R1, R2 and R3 are interconnected to the stations 2 by twisted-pair wires, as is also well-known in the token ring LAN art. Each of the stations 2 has a unique address assigned to it on its ring, so that each one of stations 2 on a given ring R1, R2 or R3 may send a message to another one of the stations 2 on the same ring R1, R2 or R3 by way of the address. The message may also be "broadcast" to all, or some subset of all, the stations 2 on the ring by way of a special address designation. Also illustrated in FIG. 1 are bridge stations $2_{b1}$ and $2_{b2}$ (collectively, $2_b$) each having more than one LAN adapter 4 resident on a different one of rings R1, R2 and R3. As will be discussed below, bridge stations $2_b$ allow inter-ring communication.

Figure 1A:
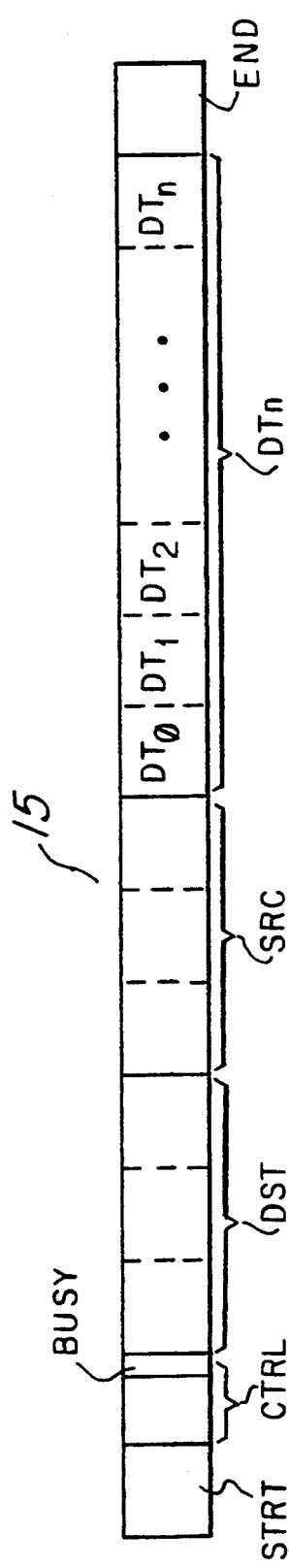
FIG. 1a illustrates a frame of data utilized in intraring communications in the LAN of FIG. 1.

As is well-known in the token ring LAN art, communication is effected with a given one of rings R1, R2 and R3 by way of serial data formatted into "frames" and transmitted from station to station along the ring. A frame consists of both address and data information which is serially transmitted from one LAN adapter 4 to another LAN adapter 4 around a given ring R1, R2 and R3. Surrounding each frame is a token, which consists of starting and ending delimiters, and a control word indicating the status of the token, e.g., whether or not a frame of address and data information is contained between the starting and ending delimiters of the token. A token is so being serially transmitted along the ring at all times, regardless of whether or not a frame is being transmitted. If not data is being transmitted, the control word is the token contains a signal indicating that no frame is being transmitted, i.e., the token is "free". If one of the stations 2, for example station $2_s$ on the ring R1, wishes to send a message to another one of stations 2 on ring R1, for example station $2_d$, LAN adapter $4_s$ waits for the token to reach station $2_d$. If the token is "free", adapter $4_s$ will transmit a token containing a signal indicating that the token is not free (i.e., is "busy"), followed by the transmitted frame of address information indicating that station $2_d$ is to receive the data, followed by the data itself and the ending delimiter. For purposes of clarity, the frame surrounded by the token will be referred to hereinafter collectively as a frame. FIG. 1a shows such a frame 15, indicating the relative locations therewithin of a starting delimiter STRT which indicates the beginning of a token, a control word CTRL which contains the busy indicator BUSY, destination address DST (a unique value assigned to station $2_d$, the intended destination), source address SRC, (a unique value assigned to station $2_s$, the source of the data), multiple words of data $DT_n$, and the ending delimiter END (which includes, as will be discussed below. Information relative to error detection and the status of the token). The source and destination addresses SRC and DST are each limited, according to the IEEE standard referred to above, to at most six bytes of information. It should be noted that a "free" token will consist only of starting delimiter STRT, control word CTRL (without the BUST indicator), and ending delimiter END, as no address or data information is transmitted with a free token.

In operation, each of the adapters 4 on ring R1 between source adapter $4_s$ and destination adapter $4_d$ receive the frame 15 shown in FIG. 1a in sequence. Each adapter 4 will, as further described in detail below, examine the destination address DST of the busy frame 15 to determine if its associated station 2 is the intended destination; if not, frame 15 is retransmitted by adapter 4 to the next one of adapters 4 in sequence on ring R1. The station 2 associated with an adapter 4 which is evaluating the frame 15 is not interrupted by the process, and is available to its user for other data processing operations. When the frame 15 reaches destination adapter $4_d$ associated with destination station $2_d$, destination adapter $4_d$ will recognize that the destination address DST matches the address assigned to destination station $2_d$, will load the data words $DT_n$ into memory located within destination adapter $4_d$ for later communication with destination station $2_d$, and will retransmit frame 15 on to the next sequential adapter 4, including in the ending delimiter END a signal that the data words $DT_n$ within frame 15 were received properly by destination adapter $4_d$. The frame will be re-transmitted from adapter 4 to adapter 4 around ring R1 until it reaches source adapter $4_s$, at which point source adapter $4_s$ will recognize the address of source station $2_s$ in the source address field SRC, and will interrogate the ending delimiter to determine if the frame was properly received by destination adapter $4_d$.

It should be noted that each of the adapters 4 along ring R1 may be operable to perform a CRC (cyclic redundancy code) error detection operation on the data frames within frame 15. The CRC operation is performed even by those adapters 4 which are not the destination of the message, including those in the sequence between destination adapter $4_d$ and source adapter $4_s$. If an error is detected by any of the adapters 4, including destination adapter $4_d$, a signal will be included in the ending delimiter END indicating the error; source adapter $4_s$ will sense the signal in ending delimiter END and will retransmit the data and address signal information upon the next free token, repeating the process until successful transmission is obtained.

Figure 1B:
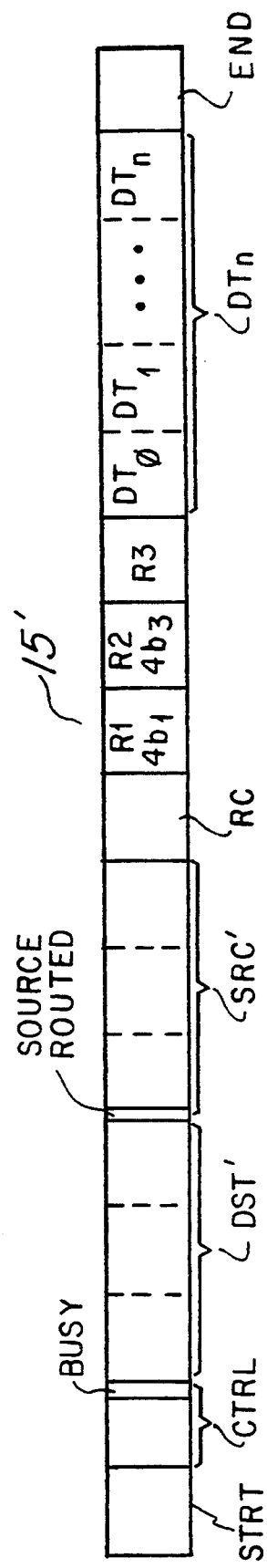
FIG. 1b illustrates a frame of data utilized in interring communications in the LAN of FIG. 1.

FIG. 1b illustrates an example of a frame 15', which is a special type of frame 15 because of data fields therewithin containing source routing addressing information for the transmission of data from source station $2_s$ on ring R1 to destination station $2_d'$ on ring R3. Frame 15' contains control word CTRL containing the BUSY indicator, and which can present an escape sequence indicating that the format of frame 15' is not within one of the established transmission formats (and that frame 15' is not to be copied). Control word CTRL is followed by destination address DST' and source address SRC' as in frame 15 of FIG. 1a. In this example, the destination address DST' in frame 15' is the address assigned to destination station $2_d'$ which uniquely specifies a station on ring R3, but which may also specify a station on another ring R1 or R2. Similarly, source address SRC' in frame 15' uniquely identifies source station $2_s$ among stations 2 connected to ring R1, but may not be unique when considering stations 2 on rings R2 and R3. If the source routing address convention is used, the most significant bit (MSB) of the first word of source address SRC' will be set to a "1"; if source routing is not used, this bit will be set to a "0". If the MSB of the first word of SRC' is a "1", a routing information word RC is transmitted by source adapter $4_s$ immediately following the last word of source address SRC' in frame 15'. Routing information word RC specifies the number of words following routing information word RC which contain the routing information. These words immediately follow routing information word RC and specifying the path which the frame 15' is to travel in going from source adapter $4_s$ on ring R1 to destination adapter $4_d'$ on ring R3. The first word specifies bridge adapter $4_{b1}$ on ring R1 as the destination of frame 15' on ring R1; the routing information word RC indicates to bridge adapter $4_{b1}$ that the frame is not destined for bridge station $2_{b1}$ but is to be transmitted by bridge station $2_b$ via adapter $4_{b2}$ into ring R2. The next word specifies bridge adapter $4_{b3}$ on ring R2 as the destination for frame 15' once on ring R2. Accordingly, bridge station $2_{b1}$ will communicate the data from its adapter $4_{b2}$ to bridge adapter $4_{b3}$. Similarly, bridge adapter $4_{b3}$ receives frame 15' with the understanding that frame 15' is not destined for its ridge station $2_{b2}$ (if it were, destination address DST' would have pointed to station $2_{b2}$ as a station 2 on ring R2, rather than to a destination station on ring R3), but is to be retransmitted onto ring R3 by way of bridge adapter $4_{b4}$. The next word in frame 15' specifies ring R3, but with no adapter 4 specified therein; this word indicates that ring R3 is the destination ring for the frame, and that the station specified by destination address DST' on this final ring is the destination station for frame 15'.

It should be noted that the transmission of frames from ring to ring may require that the bridge adapters $4_b$ wait for a free token prior to continuing the transmission of frame 15' on the next ring (R2 and R3, respectively). As is well-known in the art, however, the control words CTRL may contain priority information so that, in the event that two adapters 4 are simultaneously attempting to transmit data on one of rings R1, R2 or R3, one of the frame types will take priority over the other. It has been determined that it is preferable, from a standpoint of minimizing the frequency of such conflict, that inter-ring communication take priority over intra-ring communication.

It should also be noted that direct memory access (DMA) is the preferred method of communication between bridge adapters $4_b$ through a bridge station $2_b$. As well as the mere transparent transmission of frame 15' therethrough, bridge station $2_b$ could also perform modifications to the information in frame 15', such as 'stripping' the frame in such a manner that the address comparison required of the destination adapter $4_d'$ on ring R3, for example, would not be required to perform any address comparison other than that in the single-ring context. Such an arrangement, as well as other arrangements for inter-ring bridging, are well-known to those of ordinary skill in the art.

It should become apparent from FIGS. 1a and 1b that the address field comparison required by adapters 4 is significantly different in a multiple ring context than in a single ring context. In addition, as discussed in the preceding paragraph, not all of adapter 4 may be required to comprehend any other address comparison other than comparing destination address DST to its own address. It is therefore apparent that customized address comparison hardware is necessary for specific ones of adapters 4, and that the customized address comparison hardware could change from one token ring LAN application to another.

Figure 2:
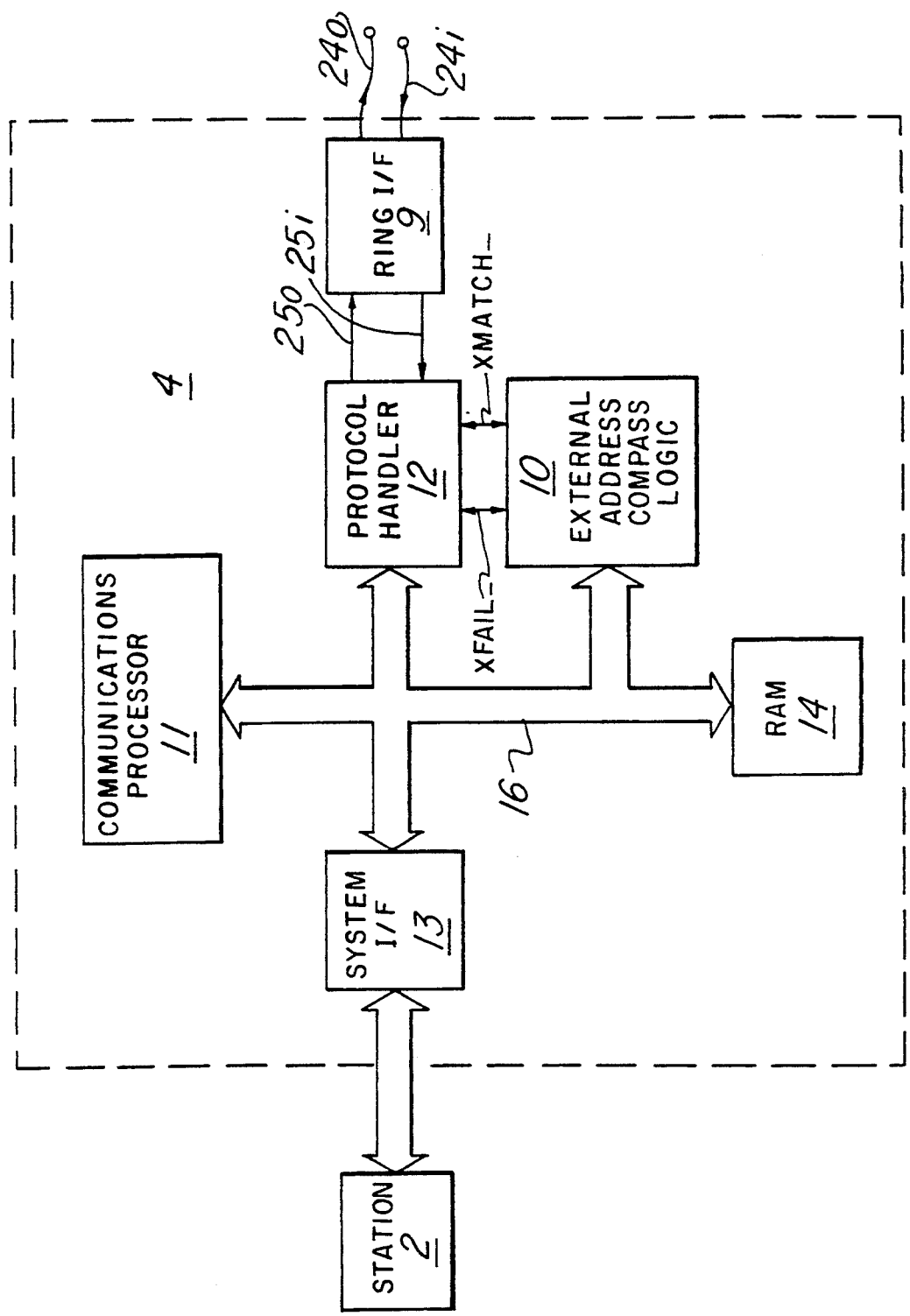
FIG. 2 is a block diagram of a LAN adapter as used in the LAN of FIG. 1.

Referring to FIG. 2, there is shown a block diagram of a LAN adapter 4 containing address comparison logic 10 for such customized address comparison needs as used in the source routing bridging described above. LAN adapter 4 includes ring interface circuitry 9 which is connected to the token ring LAN by way of serial input line 24$i$ and serial output line 24$o$. Ring interface circuitry 9 is substantially comprised of input and output buffers specifically adapted to the signal levels and format utilized by the token ring LAN, such as those used in realizing the above-referenced IEEE 802.5 system. LAN adapter 4 further includes protocol handler 12 which is connected to ring interface circuitry 9, and to local data bus 16. Local data bus 16 is a parallel data bus, for example sixteen bits wide, which is used to communicate address and data information among the various components within LAN adapter 4; the address and data information carried on local data bus 16 are time-multiplexed relative to one another. Local data bus 16 is connected to random access memory (RAM) 14, RAM 14 being used for storage of information received and to be transmitted by LAN adapter 4. Local data bus 16 is further connected to address comparison logic 10 which will be described below, to communications processor 11 and to system interface 13. Communications processor 11 is utilized for the execution of certain data processing operations within LAN adapter 4 which are specifically directed to the token ring communications, so that station 2 and its central processing unit are not loaded down with functions that can be performed locally within LAN adapter 4. System interface 13 controls the communication between LAN adapter 4 and the associated station 2, interfacing local data bus 16 to host data bus 17, and synchronizing operations (such as DMA) between station 2 and LAN adapter 4 by way of interrupts and other well-known techniques. Besides protocol handler 12 discussed above, integrated circuits are currently commercially available for the communications processor 11 and system interface 13, namely the TMS 38010 and TMS 38030, respectively, manufactured and sold by Texas Instruments Incorporated.

Protocol handler 12 performs the functions of receiving incoming frames 15 as described above in FIG. 1 and controlling the remainder of LAN adapter 4 accordingly, as well as to transmit outgoing frames 15 onto output serial line 25.

Figure 3:
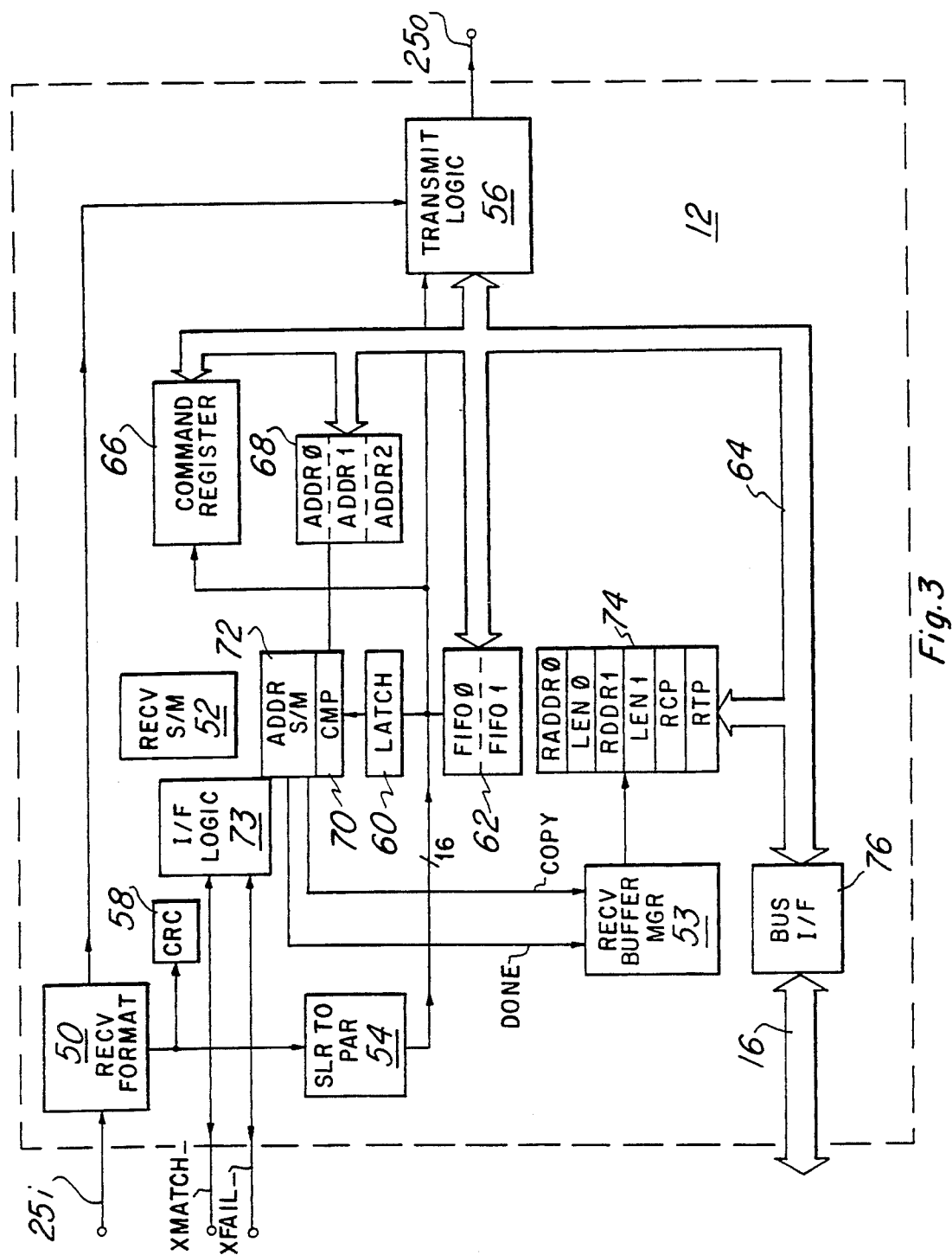
FIG. 3 is a block diagram of the protocol handler circuit constructed according to the invention, and utilized in the LAN adapter of FIG. 2.

Referring now to FIG. 3, the construction and operation of the protocol handler 12 with respect to the receipt of frames 15, and the processing thereof, will be described; the details of the transmit side of protocol handler 12 will not be set forth herein, as the understanding of its construction and operation is neither essential nor helpful in understanding the instant invention.

As indicated in FIG. 2, protocol handler 12 is connected to ring interface circuitry 9 for the receipt and transmission of serial data; this connection is by way of serial input line 25$i$ (input of data from ring interface 9 to protocol handler 12), and by way of serial output line 25$o$. Serial input line 25$i$ is connected to receive format circuitry 50 in protocol handler 12, which converts the serial data from its input format (Differential Manchester) to a format comprehensible by the circuitry internal to protocol handler 12. Receive format circuitry 50 also contains circuitry for detecting starting delimiter STRT, and notifies receive state machine 52 in such an event. Receive state machine 52 is sequential logic which serves as the control logic for the receive side of protocol handler 12, and is operatively connected to the individual elements shown in FIG. 3 to control their operation according to the data received by serial input line 25$i$ (and received via local data bus 16). Such connection of receive state machine 52 to the other elements within protocol handler 12 is not shown for the sake of clarity, but will be understood in the description herein.

Receive format circuitry 50 has a first output connected to deserializer 54, and a second output connected to transmit logic 56. Transmit logic 56 contains such logic necessary in the transmission of serial data on line 25$o$, and is included in the above-referenced TMS 38020 device. The connection of receive format circuitry 50 to transmit logic 56 is used to quickly forward frames 15 through protocol handler 12, and accordingly through LAN adapter 4 containing protocol handler 12, in the event the frame 15 is not addressed to the LAN adapter 4 associated with the specific protocol handler 12 shown in FIG. 3. The output of receive format circuitry 50 connected to deserializer 54 is also received by CRC checker 58, which analyzes the serial data to determine, via cyclic redundancy code, if noise or other artifacts have disturbed the data during transmission along the ring. Deserializer 54 is an sixteen-bit serial-in parallel-out register which is operable to receive the serial data from receive format circuitry 50, so that once the sixteen bits therein are filled, a sixteen-bit parallel data word is presented at its output. Receive state machine 52, upon being notified of the receipt of starting delimiter STRT by receive format circuitry 50, synchronizes deserializer 54 so that the beginning of each sixteen-bit word output by deserializer 54 is in the proper bit position.

The output of deserializer 54 is connected to transmit logic 56, to command registers 66, to two-stage FIFO 62 for data buffering purposes, and to address latch 60 for use in the internal address comparison operation. The multiple outputs of deserializer 54 illustrate the possible functions which may be performed upon received data by protocol handler 12, under the control of receive state machine 52 therewithin. The connection of the output of deserializer 54 to transmit logic 56 is so that control word CTRL of a received frame 15 is directly received by transmit logic 56, for its modification and resending on serial output line 25$o$. The connection of the output of deserializer 54 to command registers 66 allows incoming serial data to provide control of protocol handler 12.

For received data which corresponds to data fields $DT_n$. FIFO 62 will receive and store the data words, transmitting them to PH bus 64 on a first-in-first-out basis for storage in RAM 14 in LAN adapter 4, and for eventual transmission to station 2. Received data is sent from protocol handler 12 to RAM 14 by way of a direct memory access (DMA) operation therebetween via PH bus 64 and local data bus 16. Receive registers 74 include registers which store addresses in RAM 14 to which received data is to be written. As discussed above, local data bus 16 time-multiplexes the memory address and the memory data thereupon; similarly, the address and the data information on PH bus 64 are also time-multiplexed and applied, via bus interface 76, onto local data bus 16. Bus interface 76 is also controlled by receive state machine 52 so that the necessary control and timing signals (such as read/write and address strobe signals) are also generated along with the address and data information on local data bus 16, in a manner well-known in the art. To effect the transmission of received data from protocol handler 12 to RAM 14, receive state machine 52 controls receive registers 74 to place the contents of the destination address in RAM 14 onto PH bus 64, for application by bus interface 76 onto local data bus 16. Receive state machine 52 will then cause stage FIFO1 of FIFO 62 (i.e., the oldest data in FIFO 62), to be applied onto PH bus 64, so that it may be applied by bus interface 76 to local data bus 16 along with the necessary control signals indicating that the data is to be written into the addressed location in RAM 14. The prior contents of stage FIFO0 are shifted into stage FIFO1 therewithin, awaiting the next DMA transmission to RAM 14, permitting the next word from deserializer 54 to load stage FIFO0 of FIFO 62.

When RAM 14 is used as a recoverable buffer as discussed above, not only will data fields $DT_n$ be transferred to local data bus 16 for storage in RAM 14, but all words in a frame 15 beginning with control word CTRL, and including destination address DST and source address SRC and, for frames 15' further including routing information word RC and the words contained in frame 15' directed to ring and bridge addressing, will also be transferred to local bus 16 for storage in the addressable space of RAM 14 used as the buffer. As will be evident from the description hereinbelow, external address comparison logic 10 will analyze these words from frame 15 via local bus 16 in performing the address comparison function. Specific registers are contained within receive registers 74 which are directed to the use of RAM 14 as a recoverable buffer. The above-referenced TMS 38020 protocol handler integrated circuit manufactured and sold by Texas Instruments Incorporated contains the necessary logic and registers to have the capability of handling two DMA channels, i.e., the DMA operation may be set up for two different addressable locations in RAM 14. Referring to FIG. 3, these specific registers include registers RADDR0 and RADDR1 which serve to store two addresses within RAM 14 to which the next DMA operation is to take place. Receive registers 74 further include registers LEN0 and LEN1 which store the lengths of the free space available in the buffer area in RAM 14 associated with the addresses stored in registers RADDR0 and RADDR1, respectively. Receive registers 74 further include receive chain pointer RCP, which contains the beginning address of the buffer which is currently being written to via the DMA operation. Receive temporary register RTP stores and address in RAM 14 to which the DMA operation is to write data to in the event that the current buffer becomes filled (i.e., the one of registers LEN0 or LEN1 associated with the current buffer reaches zero). Control of the receive registers 74 used in DMA is effected by way of receive buffer manager 53, under the control of receive state machine 52. Receive buffer manager 53 consists of the necessary logic required to effect the loading and output of data from registers RADDR0, RADDR1, LEN0, LEN1, RCP and RTP as necessary in the DMA operation.

In LAN adapter 4 constructed according to the invention, as in prior LAN adapters 4 incorporating the above-referenced TMS 38020 integrated circuit, each buffer in RAM 14 stores, at its beginning, a data word indicating the length of the particular buffer area and the starting address of the next buffer to be used. Protocol handler 12 receives this information as it begins use of a buffer in RAM 14, and under the control of receive buffer manager 53 will load the data word indicating the length of the buffer area into the associated register LEN0 or LEN1, as the case may be, and will load the starting address of the next buffer area into receive temporary register RTP. Such buffering performed by protocol handler 12 is well-known by those skilled in the art, having reference to the above-referenced TMS 38020 integrated circuit.

Receive buffer manager 53 is responsive to the address comparison performed by comparator 70, by way of signals on lines DONE and COPY from address compare state machine 72, to control the DMA operation so that the buffer used in the receipt of a frame 15 is either overwritten with the next frame, or not so overwritten. Receive buffer manager 53 is operative to examine the logic level of line COPY at the time that a high logic level exists on line DONE. Accordingly, line DONE indicates that the address comparison process is completed. In the event that both internal and external address comparison is performed, line DONE corresponds to the completion of the latter of the two events, regardless of their order. A logic high level on line COPY, in conjunction with the low-to-high transition on line DONE, indicates that the frame 15 is to be retained in the recoverable buffer space of RAM 14. A logic low level on line COPY at that time indicates to receive buffer manager 53 that the frame 15 is not to be retained and that the recoverable buffer space of RAM 14 used to store the frame 15 may be written over with succeeding frames 15.

This is achieved by the use of the registers RADDR0 and RADDR1, in conjunction with receive chain pointer RCP, for example, if the DMA operation of writing an incoming frame 15 is using the buffer space in RAM 14 associated with the address stored in register RADDR0, receive chain pointer RCP will contain the starting address of the area in RAM 14 of the buffer. The DMA operation will continue until address compare state machine 72 receives the low-to-high transition on line DONE, indicating that the comparison performed by comparator 70 is complete, with the result indicated on line COPY. As described above, the signal on line COPY indicates that frame 15 should be either retained (line COPY having a "1" logic level) or ignored (line COPY at a "0" level). In the event that frame 15 is to be ignored, receive state machine 52 will load the contents of receive chain pointer RCP back into register RADDR0, and the next frame 15 received will be stored, via DMA, in the same buffer space of RAM 14 as before. In the event that frame 15 is to be retained, receive state machine 52 will begin the DMA operation to store the next frame 15 in a new buffer by loading the contents of receive temporary register RTP into receive chain pointer RCP. The next DMA operation will use registers RADDR1 and LEN1 to indicate the current buffer address and free space available in the new buffer; receive temporary register RTP will be loaded with the value of the next buffer area to be utilized. Frame 15 will thus be available for reading by station 2 reading the appropriate locations in RAM 14 via system interface 13.

It should be noted that the above-described function of control of the DMA function in the receipt of frames 15 is described as controlled by way of receive buffer manager 53. Such control could also be effected by logic contained within receive state machine 52 which is dedicated to the DMA operations for received frames 15, without the requirement for the separate logic of receive buffer manager 53. Such separation of the receive buffer manager 53 from receive state machine 52 is merely a matter of design choice, due to the separate functions performable by receive buffer manager 53. The particular organization of such control logic within protocol handler 12 can of course be modified from that described herein by one of ordinary skill in the art having reference to this description, depending upon the specific application of protocol handler 12.

Command registers 66, as discussed above, are operative to receive command information via PH bus 64. Receive state machine 52 is connected to command registers 66 to receive instruction codes therefrom, and to control the DMA operation for storing the address and data received in a frame 15 into RAM 14 according to said instruction codes, and according to the control information contained within the frame 15. As will be described below, the address information transmitted to RAM 14 along local data bus 16 will also be received by external address comparison logic 10, so that the extended address comparison required in source routing and other extended addressing schemes can be performed.

For received data which corresponds to address information (e.g., destination address DST in frame 15), the output of deserializer 54 will be received and stored by address latch 60 for purposes of the comparison function. Connected to address latch 60 is address comparator 70, which is also connected to address compare registers 68. Address compare registers 68 store the address information corresponding to the destination address DST assigned to the station 2 associated with the illustrated protocol handler 12. Multiple registers are shown as address compare registers 68. This allows the multiple words of destination address DST in a frame 15 (up to six bytes) to be compared, on a byte-by-byte basis, with multiple bytes stored in address compare registers 68. Address compare registers 68 can be loaded with the assigned destination address values during the initialization of LAN adapter 4, via PH bus 64. In addition, the connection of address compare registers 68 to PH bus 64 allows the dynamic loading of the value against which destination address DST is to be compared. Control of the address comparison function is accomplished by way of address compare state machine 72, in a manner which will be described in further detail below. Address compare state machine 72 communicates to external logic by way of interface logic 73. Interface logic 73 drives and receives external signals on lines XMATCH_ and XFAIL_, which provide for communication between protocol handler 12 and external address comparison hardware 10, in a manner which will be described in further detail below.

Figure 4:
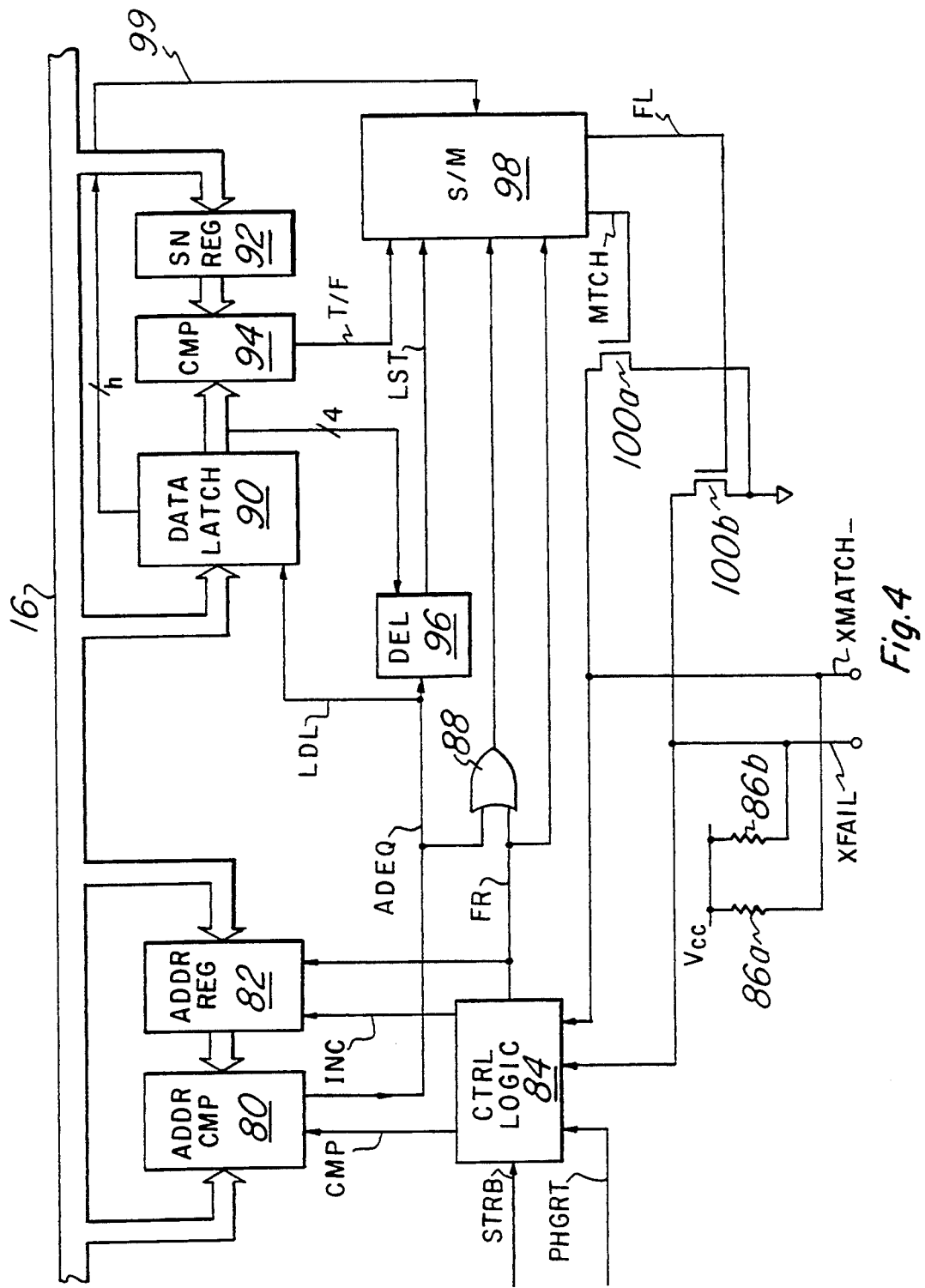
FIG. 4 is a schematic diagram of external address comparison logic used in conjunction with the protocol handler constructed according to the invention and illustrated in FIG. 3.

Referring now to FIG. 4, the construction of an example of external address comparison logic 10, and its interconnection to and operation with a protocol handler 12 which is constructed according to the instant invention, will be described. As illustrated in FIG. 2, external address comparison logic 10 is connected to local data bus 16, and is operable to receive address information transmitted in frames such as frame 15' of FIG. 1b. Proper comparison of such address information by external address comparison logic 10 requires that handshaking or other synchronization be available to indicate to external address comparison logic 10 when such address information is present on local data bus 16. Since RAM address and data information is time-multiplexed on local data bus 16, with the buffer address for RAM 14 preceding the received data (such as the address information in frame 15') thereupon, external address comparison logic 10 performs an analysis of both the RAM address and RAM data information in order to perform the address comparison function.

External address comparison logic 10 includes address comparator 80 and address register 82 which are connected to local data bus 16. Control logic 84 controls the operation of address comparator 80 and address register 82 via lines CMP and INC, respectively. Control logic 84 receives signal STRB from local data bus 16, which is a clock signal generated by bus interface 76 of protocol handler 12, and appears coincident with a RAM address on local data bus 16. Control logic 84 further receives a control signal on line PHGRT from protocol handler 12, which indicates that access to local data bus 16 has been granted to protocol handler 12. Control logic 84 thus is able to distinguish the presence of an address signal from protocol handler 12 (active signal STRB in conjunction with an active signal on line PHGRT) from an address signal on local data bus 16 from another source (active signal STRB when line PHGRT is inactive). Address register 82 is also controlled by a signal on line FR so that it is loaded with the RAM address value of the first word in the data buffer in RAM 14. As discussed below, line FR goes to a high level at the beginning of the external comparison process so that, in conjunction with the strobe signal STRB indicating the presence of an address value on local data bus 16 and an active signal on line PHGRT indicating that the address value is from protocol handler 12, address register 82 will be loaded with the initial address value.

As described above relative to FIG. 3, control logic 84 receives signals on lines XMATCH_ and XFAIL_ from interface logic 73 in protocol handler 12, to generate the signal on line FR at the beginning of the external comparison operation. It should be noted that, as will be discussed in greater detail hereinbelow, interface logic 73 contains bleeder transistors to lines XMATCH_ and XFAIL_, so that if no external circuitry such as external address comparison logic 10 is attached thereto, both lines XMATCH_ line XFAIL_ will be pulled will remain low. Also, as will be discussed in further detail below, this will be interpreted by address compare state machine 72 as a "fail" condition from external address compare logic 10, so that the results of the internal comparison will control whether or not the frame will be copied into LAN adapter 4. Responsive to receiving the beginning of a frame, and coincident with the receipt of control word CTRL, interface logic 73 in protocol handler 12 will drive both lines XMATCH_ and XFAIL_ to a low logic level, in order to indicate to external address comparison logic 10 that the start of a new frame 15 is being received. External address comparison logic 10 will communicate the results of its comparison by pulling one of lines XMATCH_ or XFAIL_ low, depending upon the results of the comparison. The operation of protocol handler 12, with respect to address comparison, is thus controlled by the logic states on lines XMATCH_ and XFAIL_ as indicated in the following table:

| XMATCH | XFAIL | |
|---|---|---|
| HI | HI | Idle state; external address comparison logic 10 awaiting address information |
| LO | LO | Asserted by protocol handler 12 with control word CTRL in a frame; external address comparison logic 10 to begin comparison |
| LO | HI | Asserted by external address comparison logic logic 10 to indicate a completed comparison with a match condition |
| HI | LO | Asserted by external address comparison logic 10 to indicate a completed comparison with a failed condition |

Accordingly, in the absence of external circuitry attached to lines XMATCH_ and XFAIL_, the condition of a failed external comparison will be present at all times. As will be discussed below, this enables the internal address comparison function to determine if the data fields $DT_n$ in frame 15 are to be retained in RAM 14.

As is evident in FIG. 4, however, external address comparison logic 10 includes pull-up registers 86a and 86b, which connect lines XMATCH_ and XFAIL_, respectively, to the $V_{cc}$ power supply. In this condition, as described in the above table, the internal address comparison feature is aware of the presence of external address comparison logic 10, will generate the required signals on lines XMATCH_ and XFAIL_, and will respond to the external comparison, accordingly, As will be discussed in detail below, interface logic 73 in protocol handler 12 drives both lines XMATCH_ and XFAIL_ low upon receipt of control word CTRL in a frame 15; this indicates to any external address comparison logic 10, including that illustrated in FIG. 4, that the address comparison function is to begin with the next RAM address and data information appearing on local data bus 16. Control logic 84 accomplishes this by enabling comparator 80 by signal CMP, which is generated upon the logical AND of the STRB signal with XMATCH_ and XFAIL_ both at a low state. Control logic 84 will also issue a signal on line FR in this event, which will be utilized by address register 82 to load the value of the address on local data bus 16 at that time, and will also be received by the data comparison side of external address comparison logic 10 shown in FIG. 4. If the comparison of the RAM address on local data bus 16 with the contents of address register 82 is true, indicating that the RAM address matches the expected value which was loaded into address register 82 as indicated above, comparator 80 will issue a signal on line ADEQ to the data comparison side of external address comparison logic 10. Each subsequent occurrence of a signal on line STRB in conjunction with an active signal on line PHGRT will cause control logic 84 to increment the contents of address register 82 via line INC and to issue a new signal on line CMP to comparator 80. In this manner, comparator 80 will continue to compare each subsequent RAM address to the next incremental value, so that a departure from the expected sequence of data words from frame 15 can be detected. Such departure can occur by way of an interrupt, or other similar event by which another portion of LA adapter 4 takes control of local data bus 16.

The RAM data comparison side of external address comparison logic 10, once enabled by control logic 84 via lie FR, will compare the contents of certain data words in the sequence of information contained in a frame 15 to expected values. SN register 92 is contained within this portion of external address comparison logic 10, and is loaded from local data bus 16 with the ring and bridge ("segment") address of the adapter 4 corresponding thereto. External address comparison logic further includes data latch 90, which is used to temporarily store the data words communicated on local data bus 16. Data latch 90 and SN register 92 are both connected to comparator 94, which presents an output on line T/F, based on the results of the comparison of the contents of data latch 90 to the contents of SN register 92. Control of the data side of external address comparison logic 10 is done by state machine 98. State machine 98 is merely sequential logic configured to realize the functions described herein, responsive to signals on lines LDL, T/F, and LST. Lines FR and ADEQ are each connected to an input of OR gate 88, which is connected at its output to line LDL, which in turn is input to state machine 98. State machine 98 is operable to assert various control outputs to control the operation of data latch 90, comparator 94, SN register 92, and decrementer 96, such control outputs not shown for the sake of clarity. In addition, based on the results of the comparison performed by comparator 94, state machine 98 will present signals on lines FL and MTCH, which are connected to the gates of transistors 100a and 100b, respectively.

Certain bits, including the most significant bit, of data latch 90 are directly connected to state machine 98 via lines 99. These bits are analyzed at the appropriate times to determine if source routing frame 15 is being received, and also if the escape sequence is being received, as will be described below. In addition, a predetermined number of bits, for example four bits, of the output of data latch 90 are connected to decrementer 96. Decrementer 96 is a counter which receives the number of data words present in a frame 15' which contain ring and bridge ("segment") information, the number of these words being specified within routing control word RC. Decrementer 96 is connected to line ADEQ from address comparator 80, and counts down with each subsequent match of the RAM address value to provide a signal on line LST at such time as the final segment address information is received, to allow state machine 98 to output the results of the comparisons performed on the segment information only lines FL and MTCH, as the case may be. Transistors 100a and 100b will drive either of lines XMATCH_ or XFAIL_ low, respectively, to communicate the result of the external address comparison operation to address compare state machine 72 in protocol handler 12.

Figure 5:
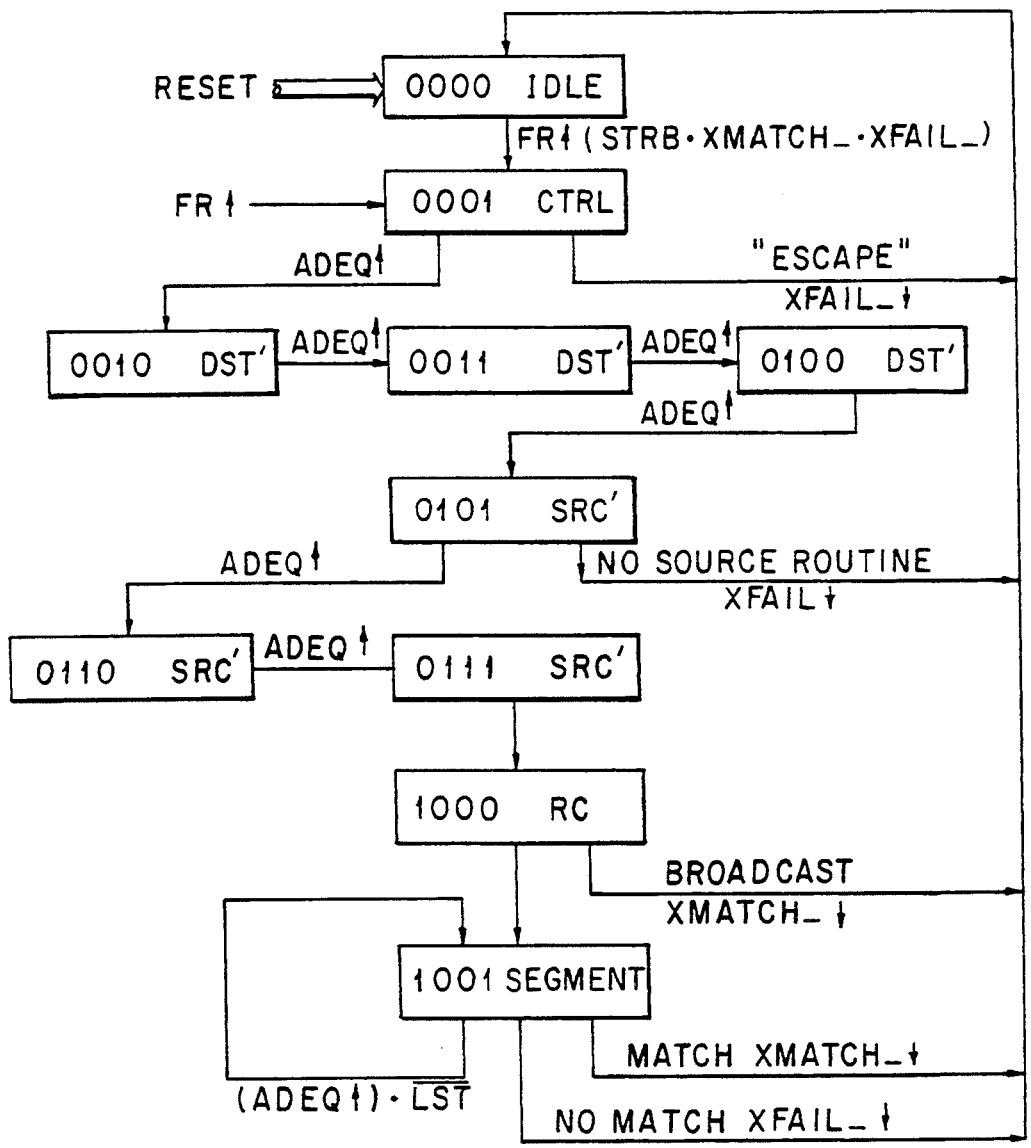
FIG. 5 is a state diagram of the state machine used in the external address comparison logic illustrated in FIG. 4.

Referring now to FIG. 5, a state diagram for state machine 98 is illustrated, which will describe the operation of external address comparison 10 in performing the address comparison on a frame 15' such as that illustrated in FIG. 1b. Initially, state machine 98 is in the idle condition in state 0000 (binary). As discussed above, control logic 84 will set line FR to a high logic level upon the logical AND of the signal on line STRB active with signals on lines XMATCH_ and XFAIL_ active low. This indicates the presence of control word CTRL of frame 15 on local data bus 16; line LDL from the output of OR gate 88 will go to a high level, and data latch 90 will receive and store control word CTRL. State machine 98 will then pass into state 0001, to await the first data word following control word CTRL, i.e., the first word of destination address DST'. It should also be noted that a high logic level on line FR will cause state machine 98 to enter state 0001, upon the logical AND of line STRB active with signals on lines XMATCH__and XFAIL__active low. After control word CTRL has been transmitted on local data bus 16 by protocol handler 12, address compare state machine 98 will allow both lines XMATCH__and XFAIL__to again be pulled high by pull-up registers 86a and 86b, respectively.

During state 0001, state machine 98 examines certain of the bits of the contents of data latch 90 communicated thereto via lines 99 to determine if control word CTRL contains the code corresponding to an "escape" sequence. Such an escape sequence could be transmitted for any one of a number of well-known reasons, in order to unconditionally stop the address comparison and preclude retention of the data fields $DT_n$ within fame 15 by LAN adapter 4. If the escape sequence code is present within control word CTRL to the escape sequence, state machine 98 will generate a high level on line FL to transistor 100b to pull line XFAIL__to a low state indicating a failed comparison, will return to state 0000, and the comparison process will stop for that frame. State machine 98 will otherwise pass to state 0002 upon the next occurrence of a true comparison of the RAM address on local data bus 16 to the contents of address register 82 (incremented), indicated by a high level on line ADEQ which causes state machine 98 to go to the next state. It should be noted that each occurrence of signal ADEQ, via line LDL at the output of OR gate 88, will cause data latch 90 to be loaded with the contents of local data bus 16. However, comparisons are performed by comparator 94 (or the results interpreted by state machine 98) only during certain states, as will be described below.

States 0010, 0011, and 0100 correspond to three occurrences of true comparisons by comparator 80 of the RAM address on local data bus 16 (presented by protocol handler 12 as indicated by line PHGRT) with the incremented contents of address register 82. These three occurrences correspond to the three data words making up destination address DST'. In state 0101, corresponding to data latch 90 storing the first word of source address SRC', state machine 9 will examine the most significant bit of the contents of data latch 90 to determine if the address information in the frame will include the source routing information (i.e., bridge and ring addresses) necessary for inter-ring communication. If this bit is a "0" (i.e., no segment address information is contained in frame 15), state machine 98 will drive line XFAIL__low, signifying an unsuccessful external address comparison and allowing address compare sate machine 72 to make the copy decision based solely upon the internal address comparison process described above. State machine 98 will then return to state 0000, and await the next frame. However, a "1" in this bit indicates that the frame 15 is a source routed frame, containing segment address information which requires comparison. In this event, state machine 98 will enter the next successive states 0110 and 0111 following receipt of the next two ADEQ signals corresponding to RAM address matches corresponding to the final two data words of source address SRC'.

The first occurrence of signal ADEQ after state 0111 will cause state machine 98 to enter state 1000 and receive source routing control word RC. Contained within source routing control word RC is a value corresponding to the number of data words following thereafter which are directed to segment addresses (i.e., contain ring and bridge addressing information). This value is loaded into decrementer 96. In addition, source routing control word RC contains a bit which indicates if frame 15' is a "broadcast" frame, i.e., directed to all rings R1, R2 and R3 in such a manner that all bridge stations $2_b$ should copy frame 15'. If such is the case, state machine 98 will drive line XMATCH__to a low state, indicating to address compare state machine 72 in protocol handler 12 that frame 15' should be copied regardless of the ring and bridge address information. State machine 98 will then return to state 0000.

In the event that source routing control word RC indicates that frame 15' is not a broadcast frame, upon the next occurrence of signal ADEQ state machine 98 will enter state 1001. Upon each subsequent occurrence of signal ADEQ, the contents of decrementer 96 will be decremented so long as signal LST is not asserted by decrementer 96. Decrementer 96 asserts signal LST when its contents equal "1", i.e., when the last segment address word is active on local data bus 16. Comparator 94 will compare each segment address word presented upon local data bus 16 to its own segment address value which is stored in SN register 92. This will continue until sate machine 98 receives signal LST, indicating that the last of the segment addresses has been latched into data latch 90. Upon receiving signal LST, state machine 98 will either drive line XMATCH__low if one of the segment addresses match the contents of SN register 92, or will drive line XFAIL__low if none of the segment addresses MATCH the contents of SN register 92. The external address comparison function is thus complete, and state machine 98 will return to state 0000 to await indication of the next one of frames 15' by the logical AND of line STRB active with lines XMATCH__and XFAIL__active low.

As discussed above, address compare sate machine 72 is responsive to lines XMATCH__and XFAIL__in such a manner that even if the internal address comparison routine does not result in a copy of the frame 15', frame 15' is copied, and the buffer in RAM 14 not received, in the event of a match found by external address comparison logic 10.

Figure 6:
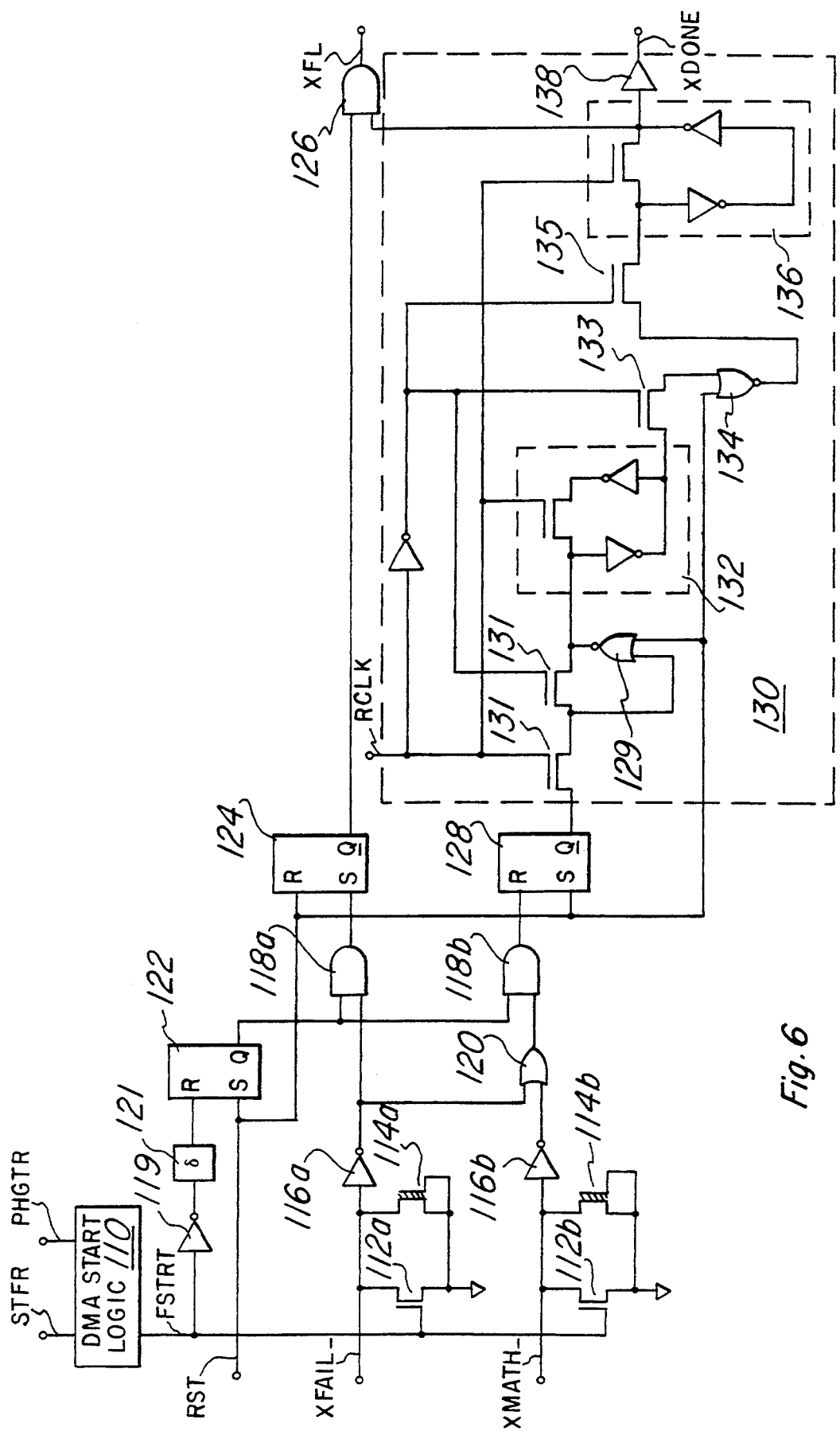
FIG. 6 is an electrical diagram, in schematic form, of the interface logic within the protocol handler constructed according to the invention and illustrated in FIG. 3.

Referring now to FIG. 6, the construction and operation of interface logic 73 incorporated in protocol handler 12 and constructed according to the invention will be described in detail. Interface logic 73 is connected to address compare state machine 72 by way of lines XDONE and XFL, indicating completion of the external address comparison and the results of the external comparison, respectively. Interface logic 73 is also connected to lines XMATCH__and XFAIL__in a manner to be described. DMA start logic 110 receives a signal on line STFR, which is a signal output by receive format circuitry 50 upon receipt of a control word CTRL within a frame 15. DMA start logic 110 also receives a signal on line PHGRT from bus interface circuit 76 upon the grant of access of protocol handler 12 to local data bus 16 for a DMA cycle. The function of DMA start logic 110 is to generate a high logic state on line FSTRT upon receiving both signals on lines STFR and PHGRT; this indicates the start of a frame 15' (i.e., presence of control word CTRL) in conjunction with DMA access to local data bus 16 granted to protocol handler 12. Line FSTRT is connected to the gates of transistors 112a and 112b, which have their source-to-drain paths connected between lines XFAIL__and XMATCH—, respectively, and ground. Accordingly, responsive to the presence of the control word CTRL in communication with DMA access granted to local data bus 16, both lines XFAIL—and XMATCH—will be pulled to a low logic state. As discussed above, this communicates the start of a frame 15 to external address comparison logic 10. Accordingly, DMA start logic 110 substantially performs a logical AND operation, but it also includes such pass gates and other timing circuitry so that the signal on line FSTRT occurs at the proper time for the operation of the external address comparison circuitry 10.

Lines XFAIL—and XMATCH—are also connected to bleeder transistors 114a 114b, respectively. Bleeder transistors 114a and 114b are small (relative to transistors 112a and 112b) depletion mode transistors which have their gates connected to ground, and perform the function of setting lines XMATCH—and XFAIL—to a low level absent other circuitry. As described above, in the event that external address comparison logic is used, pull-up resistors 86a and 86b will be connected to lines XMATCH—and XFAIL—so that the default condition of both lines high will occur; these resistors can easily beside by one of ordinary skill in the art so that, consistent with the operation of bleeder transistors 114a and 114b, lines XMATCH—and XFAIL—will remain high. In the preferred embodiment, the value of resistors 86a and 86b is approximately 2.3 kilohms for a power supply nominally at 5.0 volts.

Lines XMATCH—and XFAIL—are also each connected to the input of an inverting buffer 116a and 116b, respectively. The output of inverting buffer 116a is connected to one input of AND gate 118a and to one input of OR gate 120; the output of inverting buffer 116b is connected to the other input of OR gate 120, OR gate 120 having its output connected to an input of AND gate 118b. Connected to an input of each of AND gates 118a and 118b is the Q—output of RS latch 122. RS latch has its reset input connected to line FSTRT from DMA logic 110 via inverter 119 and delay stage 121, and has its set input connected to line RST, which is a reset signal generated by receive state machine 52 at the beginning of a received frame 15. Accordingly, upon the beginning of frame 15, RS latch 122 will be set, which puts the Q—output of latch 122 at a "0" level. This holds the outputs of AND gates 118a and 118b low, despite lines XFAIL—and XMATCH—being pulled low by transistors 112a and 112b during the receipt of control word CRTL on frame 15 received by protocol handler 12.

Upon the completion of the DMA cycle which communicates control word CTRL, line FSTRT will return to a low logic level. Transistors 112a and 112b will then be turned off, said pull-up resistors 86a and 86b (shown in FIG. 4) will return lines XFAIL—and XMATCH—to a logic "1" level. After inversion by inverter 119 and a predetermined delay by way of delay stage 121 (which can, of course, be constructed by way of a series of logic inverters and/or pass gates), RS latch 122 will be reset. The purpose of delay stage 121 is to delay the reset of RS latch 122 until well after lines XFAIL—and XMATCH—will have returned to a high level (if resistors 86a and 86b are present), so that a false fail signal will not be generated to the remainder of address compare state machine 72. Once RS latch 122 is reset, the outputs of AND gates 118a and 118b are then enabled to respond to the logic state of lines XFAIL—and XMATCH—(via inverters 116a and 116b).

The operation of the interface logic 73 shown in FIG. 6 is to indicate to address compare state machine 72 whether or not the operation of external address compare logic 10 is completed and, if so, the result of the comparison. Accordingly, line XDONE is connected to address compare state machine 72 to indicate, when at a high logic level, that the external address comparison is complete, and line XFL is for indicating, at its high logic state, that the external comparison was not a match. To accomplish this, the output of AND gate 118a is connected to the set input of RS latch 124; the Q—output of RS latch 124 is connected to one input of NAND gate 126. The reset input of RS latch 124 is connected to line RST, so that the initial state of the Q—output of RS with latch 124 is a high logic level, latch 124 being reset by the signal on line RST, and line XFAIL—being at a high level thereafter (inverted by inverter 116a, causing the output of AND gate 118a to be low). This places the input of NAND gate 126 connected to the Q—output of latch 124 at a "1" level, causing the output of NAND gate 126 to be initially set dependent upon the other input thereto.

RS latch 128 has its reset input connected to the output of AND gate 118b, and has its set input connected to line RST. The Q—of RS latch 128 is input to synchronization circuit 130 and, after reset by line RST, is set initially to a low logic level. Synchronization circuit 130 is intended to synchronize the output of interface logic 73 with the serial receipt of data, so that the signals generated by interface logic 73 to address compare state machine 72 are synchronized accordingly. Line RCLK carries a clock signal which is synchronous with the serial data received within frame 15, and to which the output of interface logic 73 is to be synchronized. The Q—output of RS latch 128 is connected (via pass gates 131) to a latch 132 (comprised of a pair of inverters with a pass gate controlled by line RCLK) and, after being inverted by latch 132, is connected to a first input of NOR gate 134. NOR gate 134 has its other input connected to line RST. NOR gate 129 serves to set the initial condition of latch 132 from the signal on line RST. Accordingly, since the initial state of the Q—output of RS latch 128 is a "0", the initial state of the output of latch 132 is a "1" setting the output of NOR gate 134 initially to a "0" level. This in turn, responsive to pulses of the clock signal on line RCLK, presents an initial state at the other input of NAND gate 126 at a "0" level, so that the initial condition of the output of NAND gate 126, i.e., line XFL, is at a "1" logic level. Since the initial output of NOR gate 134 is at a "0" logic level, the initial output of line XDONE, via non-inverting buffer 138, is at a "0" logic level.

After the initialization process responsive to receipt of control word CTRL and the reset signal on line RST, interface logic 73 is ready to respond to either line XFAIL—or XMATCH—being pulled low by external address comparison logic 10 described above. The connection of the output of inverter 116a to OR gate 120 creates the effect that RS latch 128 is reset if either of lines XFAIL—and XMATCH—is pulled low, while RS latch 124 is set only if line XFAIL—is pulled low. This construction, allowing line XFAIL—to control if pulled down, provides that address compare state machine 72 will recover the data buffer created during the receipt of a frame depending upon its own internal address comparison only, in the event that both lines XFAIL—and XMATCH—are low. Accordingly, if no connection is provided to lines XMATCH—and XFAIL—, bleeder transistors 114a and 114b will allow the internal address comparison to control operation of protocol handler 12 by pulling both lines XMATCH— and XFAIL— low.

In operation, after the initialization described above, if line XFAIL— is pulled low (whether or not line XMATCH— is pulled low) by external address comparison logic 10, as in the event of a filed external comparison, RS latch 124 will change state so that a "0" level appears at the Q— output of RS latch 125. In addition, via OR gate 120, the Q— output of RS latch 128 will be reset to a "1" level. After synchronization by way of synchronization circuitry, the "1" level at the output of RS latch 128 will be inverted twice by latch 132 and NOR gate 134, placing a "1" logic level on line XDONE, thereby indicating to address compare state machine 72 that the external comparison is complete. Since the Q— output of RS latch 124 is now at a "0", and since the output of NOR gate 134 is at a "1" level, the output of NAND gate 126 is a "1", indicating a failed external comparison. Address compare state machine 72, as will be described below, is responsive to the combination of a "1" level on both of lines XDONE and XFL to make the decision of whether or not to copy the frame (i.e., not recover the buffer in RAM 14), solely on its internal comparison results.

In the event that only line XMATCH— is pulled low, the Q— output of RS latch 124 will not change state, but will remain at a "1" level. However, the Q— output of RS latch 128 will change state to a "1" level and, as described above with respect to line XFAIL— being taken low, the output of NOR gate 134 will be at a "1" level after synchronization by synchronization circuit 130. The "1" level at the output of NOR gate 134 will result in line XDONE going high, indicating that the external comparison is complete. However, since both the Q— output of RS latch 124 and the output of NOR gate 134 are at a "1" level, NAND gate 126 will drive line XFL low, indicating that the external address comparison logic 10 resulted in a match condition. Address compare state machine 72, as will be described below, is responsive to the combination of a "1" on line XDONE and a "0" on line XFL to copy the frame (i.e., not recover the buffer in RAM 14) regardless of the results of its internal comparison.

Figure 7:
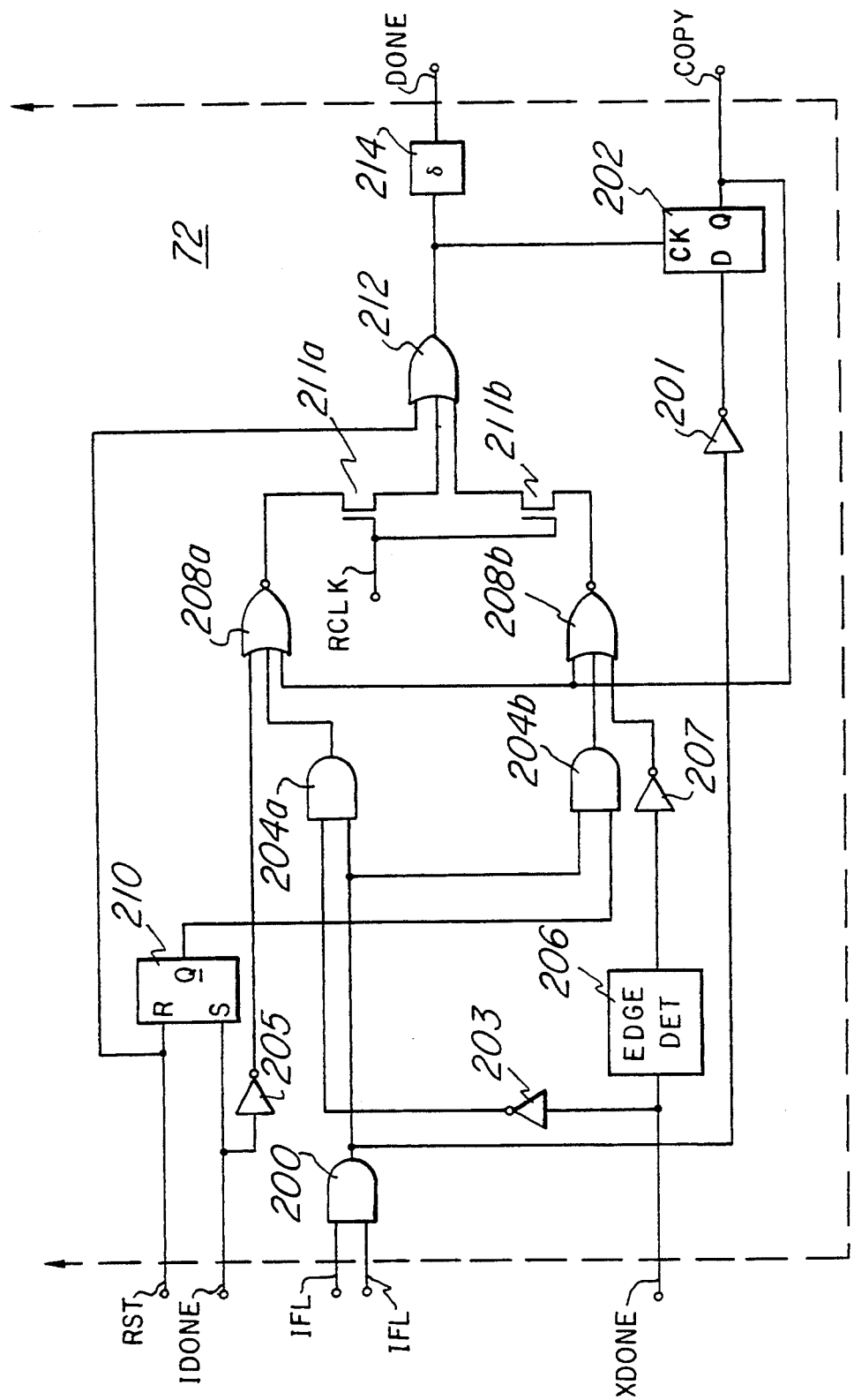
FIG. 7 is an electrical diagram, in schematic form, of logic within the address compare state machine which is responsive to the circuitry of FIG. 6, incorporated within the protocol handler constructed according to the invention and illustrated in FIG. 3.

Referring now to FIG. 7, the construction of logic within address compare state machine 72 according to the invention, and its operation in generating the appropriate signal on line COPY to receive buffer manager 53 shown in FIG. 3, will be described. As previously mentioned, receive buffer manager 53 examines the logical level of line COPY at the time of a high logic level on line DONE to determine whether or not to copy the received frame 15 (i.e., retain the buffer space). By reference to FIG. 7, it is seen that line COPY is the Q output of D-type latch 202; the clock input of D-type latch 202, delayed as necessary by delay stage 214, is line DONE.

Lines IDONE and IFL are generated by address compare state machine 72 responsive to comparisons performed by comparator 70 in the internal address compare operation. Similarly as lines XDONE and XFL from FIG. 6, line IDONE indicates completion of the internal address comparison and line IFL, in its "1" logic level, indicates that the internal address comparison did not match the pre-assigned contents stored in address registers 68. It should also be apparent that other conditions may be easily included so that other decisions can be made, for example line IFL being driven low by a "copy all frames" signal from address compare state machine 72. While line XDONE is a latched signal, as explained above relative to FIG. 6, line IDONE carries a logic high pulse for a predetermined period of time upon the completion of the internal address comparison function. In prior protocol handler circuits, such as the above-referenced TMS 38020 manufactured and sold by Texas Instruments Inc., no logic such as interface logic 73 allowed interface of external address comparison internal to protocol handler 12. In such prior circuits, D-type latch 202 latched the logic state of line IFL (inverted) upon a pulse on line IDONE to generate the signal on line COPY to receive buffer manager 53, with line IDONE (delayed as necessary) constituting line DONE to receive buffer manager 53.

In the logic within address compare state machine 72 constructed according to the invention which is illustrated in FIG. 7, lines IFL and XFL are connected to the inputs of AND gate 200. The output of AND gate 200 is connected to an input of each of AND gates 204a and 204b, and is connected via inverter 201 to the D input of D-type latch 202. Line XDONE, which carries a latched signal from interface logic 73 as described above relative to FIG. 6, is connected via inverter 203 to another input of AND gate 204a; via edge detector 206 and inverter 207. Line XDONE is also coupled to an input of NOR gate 208b via edge detector 206 and inverter 207. Conversely, line IDONE carries a pulse corresponding to completion of the internal address comparison function from address compare state machine 72. Line IDONE is connected to the set input of RS latch 210 and, via inverter 205, to one input of NOR gate 208a. The Q— output of latch 210, which is the inverted latched signal from line IDONE, is connected to another input of AND gate 204b. It should be noted that the NOR gates 208a and 208b are thus operative to receive pulses representing the low-to-high transitions on lines IDONE and XDONE, respectively, upon completion of the internal and external address comparisons, while AND gates 204b and 204a each receive latched versions of these signals. The reset input of RS latch 210 is connected to line RST. Lines RST and RCLK in FIG. 7 are equivalent to the similarly labeled lines of FIG. 6.

NOR gates 208a and 208b each receive as a second input the output of AND gates 204a and 204b, respectively. NOR gates 208a and 208b also each have a third input connected to the Q output of D-type latch 202. The output of NOR gates 208a and 208b are each coupled to an input of OR gate 212, via pass gates 211a and 211b, respectively. Each of pass gates 211a and 211b are controlled by line RCLK which, as explained above relative to FIG. 6, corresponds to the serial receive clock synchronous wit the serial data stream of frame 15. The output of OR gate 212, after delay by delay stage 214, constitutes line DONE which is connected to the clock input of D-type latch 202. The Q output of latch 202 constitutes line COPY which is connected to receive buffer manager 53.

In operation, the logic of FIG. 7 contained within address compare state machine 72 is reset at the beginning of frame 15 by line RST going to a high logic level as explained above relative to FIG. 6. As discussed above relative to FIG. 6, line XDONE is initially at a low logic level while line XFL is at a high logic level. Similarly, at the beginning of frame 15, line IDONE is initially at a low logic level while line IFL is at a high logic level. Since line XDONE is initially held low, edge detector 206 will have a low output and inverter 207 accordingly will be at a high level, forcing the output of NOR gate 208b to a logic low. Similarly, since line IDONE is at an initial low level, inverter 205 will present a logic high to NOR gate 208a, initializing the output of NOR gate 208a to a logic low level. The logic high pulse on line RST at initialization will also drive the output of OR gate 212 to a high level. Since both lines IFL and XFL are initially high, the output of AND gate 200 is initially high and, via inverter 201, the D input of latch 202 is at a "0" logic level. The high pulse at the output of OR gate 212 will thus latch a low level at the Q output of D-type latch 202 onto line COPY, and to an input of each of NOR gates 208a and 208b. After delay by delay stage 214, a pulse will appear on line DONE to receive buffer manager 53; this pulse of line DONE may be used by receive buffer manager 53 as an indication of the beginning of a frame 15.

Since both lines XFL and IFL are both initially at a high level, the output of AND gate 200 is initially at a high level. Since the high level pulse on line RST at initialization will resets the Q_output of RS latch 210 to a high logic level, and since line XDONE is initially low, the initial outputs of AND gates 204a and 204b also present a high logic level to an input of NOR gates 208a and 208b, respectively. After initialization is complete, line RST will then return to a low logic level which, the outputs of NOR gates 208a and 208b being at a low level, will pull the output of OR gate 212 to a low level, awaiting the completion of the internal or external address comparison operations. The logic illustrated in FIG. 7 is thus read for the completion of the internal and external address comparisons.

By way of example, the operation of the logic of FIG. 7 will be described for the event of the internal comparison. As will be evident from the description below, the logic of FIG. 7 is symmetric to the extent that its operation is independent of the order in which the internal and the external address comparisons are completed. Line IDONE will make a low-to-high pulse of a predetermined length upon the completion of the address comparison of comparator 70, regardless of the result of such comparison. The logical "0" presented by inverter 205 at this time will allow the state of the output of AND gate 204a to control whether or not the output of NOR gate 208a is a logic ¢1" or a logic "0∞. Since line XDONE is at a logic low level at this time because the external comparison is not yet completed, the output of AND gate 204a depends upon the result of the internal comparison (i.e., line IFL) presented by AND gate 200. Accordingly, during the time that the output of inverter 205 is at a low level, i.e., during the pulse on line IDONE, the output of NOR gate 208a will be determined by the result of the comparison. A match condition will result in line IFL going low, which will cause the output of AND gates 200 and 204a to go low, driving a high logic level at the output of NOR gate 208a; conversely a fall condition will cause the output of NOR gate 208a to remain low.

The pulse width of the signal on line IDONE is of sufficient length to ensure that a pulse of the serial receive clock on line RCLK will occur during the pulse on line IDONE; accordingly, the high logic state of the output of NOR gate 208a in a match condition will appear at the output of OR gate 212 for the during of the pulse of IDONE. As stated above, a match result of the internal address comparison will cause line IFL to be low and the output of AND gate 200 to accordingly be low. Via inverter 201, a high logic level will be presented to the D input of D-type latch 202. The pulse at the output of OR gate 212 will clock in the high level into latch 202, in turn presenting a high level on line COPY to indicate that the received frame 15 should be retained. The pulse at the output of OR gate 212 will also appear at line DONE to indicate to receive buffer manager 53 that the logic state on line COPY is valid; delay stage 214 inserts sufficient delay to permit line COPY top reach its valid state prior to the transition of line DONE. In addition, the high Q output of latch 202 is fed back to NOR gates 208a and 208b, forcing a low level at the outputs of NOR gates 208a and 208b which inhibits subsequent pulses of line DONE, such as at the completion of the external address comparison. Latch 202 will therefore remain set until initialized in the next frame 15.

However, line IFL will remain at a high level if the internal comparison failed. The output of AND gate 200 will thus also remain at a high level and, via inverter 201, the D input of D-type latch 202 will remain at a low level. The pulse on line DONE generated by NOR gate 208a at the end of the internal comparison will thus cause latch 202 to retain the low level at its output on line COPY as before.

If the internal address comparison was a fail, the results of the external address comparison performed by external comparison logic 10, and communicated to address state machine 72 via interface logic 73 shown in FIG. 6, will be examined by the logic of FIG. 7. After the predetermined pulse width referred to above, line IDONE returns to a logic low level, forcing a high level at the output of inverter 205. This forces the output of NOR gate 208a to a logic low, which will be undisturbed by the completion of the external address comparison. In addition, the pulse on line IDONE will have set latch 210 so that its Q_output provided to AND gate 204b will be at a logic low level. This forces the output of AND gate 204b to a low level, which allows NOR gate 208b to be controlled solely by the output of inverter 207; as will be seen below, this allows the DONE signal to be generated regardless of the results of the external comparison.

Upon completion of the external comparison, line XDONE will make a low-to-high transition and remain high, as described above relative to FIG. 6. Edge detector 206 will generate a pulse at its output having a predetermined length similar to that on line IDONE at the completion of the internal comparison; inverter 207 will accordingly present a logic low to NOR gate 208b for the width of the pulse generated by edge detector 206. Since, as described above, the output of AND gate 204b is low, the output of NOR gate 208b will be at a logic high level regardless of the output of AND gate 200. The length of the high output of NOR gate 208b will be for the duration of the pulse generated by edge detector 206; as discussed above, this is for a sufficient length of time so that an occurrence of a clock signal on line RCLK will present a logic high to the associated input of OR gate 212, causing a high level at the output of OR gate 212.

Similarly as in the case of the internal address comparison, the low-to-high transition at the output of OR gate 212 will clock the results of the comparison into latch 202 and onto line COPY to receive buffer manager 53. If the external comparison was a match, the low level on line XFL will drive the output of AND gate 200 low and, via inverter 201, will present a high level to the D input of latch 202. Conversely, in the event of a fail (line IFL remaining high from the failed internal comparison discussed above), a logic low level will be latched into latch 202. After the necessary delay by delay stage 214, line DONE will pulse high as before, indicating to receive buffer manager 53 that the logic level on line COPY should be examined.

Accordingly, due to interface logic 73 and to the logic illustrated in FIG. 7 contained within address compare state machine 72, protocol handler 12 constructed according to the invention allows external address comparison logic 10 to control the copy decision for each source routed frame 15' received by LAN adapter 4. This is done in such a manner that frame 15' will be copied if such external address comparison logic 10 communicates a match condition to interface logic 73 via lines XMATCH_and XFAIL_, overriding a decision by comparator 70 in conjunction with address compare state machine 72 not to copy frame 15'. This ability of protocol handler 12 to respond to lines XMATCH_and XFAIL_is independent of the actual logic employed externally thereto in making the decision, which allows great flexibility in the use of protocol handler 12 constructed according to the invention in a variety of bridging and other inter-ring communication applications.

While the invention has been described in detail herein with reference to tis preferred embodiment, it is to be understood that this description is by way of example only, and is not to be construed in a limiting sense. It is to be further understood that numerous changes in the details of the embodiment of the invention, and additional embodiments of the invention, will be apparent to, and may be made by, persons of ordinary skill in the art with reference to this description. It is contemplated that such changes and additional embodiments are within the spirit and scope of the invention claimed below.

I claim:

1. A method of selectively communicating a data frame from a first data ring network to a second data ring network, wherein each data ring network includes a plurality of addressable stations, each station associated with at least one adapter circuit for receiving the data frame, the data frame including a fixed destination address and fixed inter-ring routing information containing at least one segment address, comprising the steps of:
   transmitting the data frame to a bridge station, wherein the bridge station is locally addressable by the first data ring network through a first adapter circuit and locally addressable by the second data ring network through a second adapter circuit;
   determining, at the bridge station but independently and externally from the first and second adapter circuits, that the data frame contains inter-ring routing information therein;
   comparing, at the bridge station but independently and externally from the first and second adapter circuits, any segment address within the inter-ring routing information of the data frame to a predetermined segment address;
   transferring the data frame to the second adapter circuit upon a match of any segment address to the predetermined segment address; and
   comparing, at the bridge station but internally within the second adapter circuit, the destination address with a pre-assigned address for the bridge station.

2. The method of claim 1 and further comprising the step of generating a failed comparison signal if all of the segment addresses within the inter-ring routing information of the data frame do not match the predetermined segment address.

3. The method of claim 1 and further comprising the step of determining whether the data frame is a broadcast frame.

4. The method of claim 3 and further comprising the step of indicating that all bridge stations between the first and second data ring networks should copy the data frame if the data frame is determined to be a broadcast frame.

5. The method of claim 3 and further comprising the step of comparing any segment address within the inter-ring routing information of the data frame to a predetermined segment address if the data frame is determined not to be a broadcast frame.

6. The method of claim 5 and further comprising the step of copying the data frame into the second adapter circuit if any of the segment addresses within the inter-ring routing information of the data frame matches the predetermined segment address.

7. The method of claim 5 and further comprising the step of generating a failed match condition if all of the segment addresses within the inter-ring routing information of the data frame do not match the predetermined segment address.

8. The method of claim 1 and further comprising the step of determining whether the data frame includes an escape sequence therein.

9. The method of claim 8 and further comprising the step of generating a failed comparison signal if an escape sequence exists within the data frame.

10. A bridge station for communicating from a first data ring network to a second data ring network a data frame containing a fixed destination address and fixed inter-ring routing information including at least one segment address, wherein each data ring network includes a plurality of locally addressable processing stations, the bridge station comprising:
   input means for receiving the data frame originating in the first data ring network;
   protocol handler circuitry, comprising:
      a first address register, connected to the input means, for storing the destination address of the data frame;
      a second address register for storing a pre-assigned address; and
      an intra-ring comparator, connected to the first address register and the second address register, for comparing the destination address to the pre-assigned address;
   a local data bus, connected to the input means, for storing the data frame externally from the protocol handler circuitry;
   external address comparison circuitry operating externally and independently from the protocol handler circuitry, comprising:
      a first segment address register, connected to the local data bus, for storing inter-ring routing information;
      a second segment address register for storing a predetermined segment address;

an inter-ring comparator, connected to the first segment address register and the second segment address register, for comparing any segment address within the inter-ring routing information to the predetermined segment address; and interface terminals for passing comparison signals to the protocol handler circuitry; and decision logic responsive to both the protocol handler circuitry and the external address comparison circuitry for causing the data frame on the local data bus to be stored into a memory for presentation to the second data ring network.

11. The bridge station of claim 10 wherein the protocol handler circuitry and the external address comparison circuitry operate independently.

12. The bridge station of claim 10 wherein the interface terminals pass match and fail signals responsive to the results of the comparison in the inter-ring comparator.

13. The bridge station of claim 10 wherein the data frame containing a fixed destination address and fixed inter-ring routing information including at least one segment address remains unmodified while communicated from the first data ring network to the second data ring network.

14. The bridge station of claim 10 wherein a first data frame stored on the local bus is overwritten by a second data frame received by the input means upon a failed comparison of both the protocol handler circuitry and the external address comparison circuitry.

15. The bridge station of claim 10 wherein segment addresses within the fixed inter-ring routing information are stored in sequence and a match of the predetermined segment address with the last segment address in sequence initiates an intra-ring transfer using the fixed destination address.

* * * * *